(12) United States Patent
Yamano

(10) Patent No.: US 8,384,937 B2
(45) Date of Patent: Feb. 26, 2013

(54) IMAGE FORMING SYSTEM, IMAGE FORMING APPARATUS, CONTROL METHOD FOR IMAGE FORMING APPARATUS, INFORMATION PROCESSING APPARATUS, CONTROL METHOD FOR INFORMATION PROCESSING APPARATUS, AND STORAGE MEDIUM STORING CONTROL PROGRAM THEREOF, THAT DETERMINE WHETHER DETECTED WIRELESS COMMUNICATION SPEED IS SUFFICIENT FOR SUCCESSFUL PRINTING

(75) Inventor: Hiroshi Yamano, Kawasaki (JP)

(73) Assignee: Canon Kabushiki Kaisha (JP)

( * ) Notice: Subject to any disclaimer, the term of this patent is extended or adjusted under 35 U.S.C. 154(b) by 830 days.

(21) Appl. No.: 12/503,840

(22) Filed: Jul. 16, 2009

(65) Prior Publication Data

US 2010/0014118 A1  Jan. 21, 2010

(30) Foreign Application Priority Data

Jul. 16, 2008 (JP) ................................. 2008-184760

(51) Int. Cl.
*G06F 15/00* (2006.01)
(52) U.S. Cl. .......................... 358/1.15; 358/400; 358/434
(58) Field of Classification Search .................. 358/1.1, 358/1.5, 1.14, 1.15, 400, 401, 412, 434, 435, 358/436, 437, 438, 439, 442, 468
See application file for complete search history.

(56) References Cited

U.S. PATENT DOCUMENTS

2009/0195827 A1* 8/2009 Kimura et al. ............... 358/1.15

FOREIGN PATENT DOCUMENTS

| JP | 09-330186 A | 12/1997 |
|---|---|---|
| JP | 2001-189693 A | 7/2001 |
| JP | 2003-345537 A | 12/2003 |
| JP | 2004-122630 A | 4/2004 |
| JP | 2004-303261 A | 10/2004 |
| JP | 2006-013756 A | 1/2006 |
| JP | 2006-109054 A | 4/2006 |
| JP | 2006-129247 A | 5/2006 |
| JP | 2008-072533 A | 3/2008 |

OTHER PUBLICATIONS

JP Office Action issued Oct. 2, 2012 for corresponding JP 2008-184760.

* cited by examiner

*Primary Examiner* — Thomas D Lee
(74) *Attorney, Agent, or Firm* — Rossi, Kimms & McDowell LLP

(57) ABSTRACT

An image forming system capable of determining whether a detected communication speed reaches a communication speed needed for printing the received printing data successfully according to printing ability of an image forming apparatus. A detection unit detects a communication speed of wireless communication executed between the image forming apparatus and an information processing apparatus. An obtainment unit obtains a communication speed needed so that the image forming apparatus successfully prints the print data that is received by using wireless communication according to a printing ability of the image forming apparatus. A determination unit determines whether the communication speed detected by the detection unit reaches the communication speed obtained by the obtainment unit or not. A notification unit notifies a user that the detected communication speed is insufficient when the determination unit determines that the communication speed detected by the detection unit does not reach the communication speed obtained by the obtainment unit.

17 Claims, 12 Drawing Sheets

《CASE OF WIRELESS USB》

| (COMMUNICATION LIMIT SPEED) | | (PRINTING ABILITY OF PRINTER) |
|---|---|---|
| 53.3Mbps | <-----> | 22ppm OR LESS |
| 80Mbps | <-----> | 30ppm OR LESS |
| 106.7Mbps | <-----> | ↑ |
| 160Mbps | <-----> | ↑ |
| 200Mbps | <-----> | 40ppm OR LESS |
| 320Mbps | <-----> | ↑ |
| 400Mbps | <-----> | ↑ |
| 480Mbps | <-----> | 50ppm OR LESS |

COMMUNICATION LIMIT SPEED TABLE

COMMUNICATION LIMIT SPEED ACQUISITION COMMAND

COMMUNICATION LIMIT SPEED STATUS

TRANSMISSION TIMING OF COMMUNICATION LIMIT
SPEED ACQUISITION COMMAND DURING ASSOCIATION

IMAGE FORMING SYSTEM, IMAGE FORMING APPARATUS, CONTROL METHOD FOR IMAGE FORMING APPARATUS, INFORMATION PROCESSING APPARATUS, CONTROL METHOD FOR INFORMATION PROCESSING APPARATUS, AND STORAGE MEDIUM STORING CONTROL PROGRAM THEREOF, THAT DETERMINE WHETHER DETECTED WIRELESS COMMUNICATION SPEED IS SUFFICIENT FOR SUCCESSFUL PRINTING

BACKGROUND OF THE INVENTION

1. Field of the Invention

The present invention relates to an image forming system provided with an image forming apparatus and an information processing apparatus that is connected to the image forming apparatus via a wireless communication means and transmits printing data to the image forming apparatus by wireless communication executed by the wireless communication means.

Further, the present invention relates to the image forming apparatus and the information processing apparatus that constitute the image forming system, a control method for the image forming apparatus, a control method for the information processing apparatus, and a storage medium storing a control program therefor.

2. Description of the Related Art

In recent years, a printer that executes wireless communication, such as wireless USB communication, with a host computer, and that can receive printing data from the host computer has spread. Such a printer has an advantage that an installation position can be freely changed as compared with a printer connected with a host computer via a cable.

However, when the host computer transmits printing data to the printer using the wireless communication, there is a problem that an error due to insufficient communication speed for normal data communication depending on surrounding environment can occur.

For example, an obstacle located between the host computer and the printer may decrease the communication speed due to reflection of a radio wave. Further, when a wireless communication terminal using the same frequency band is used near the host computer or the printer, the communication speed may fall.

When the communication speed between the host computer and the printer decreases due to these causes, a transmission process of the printing data cannot catch up the printing process of the printer side. This causes buffer under-run, and an error occurs in the printer.

At this time, a user cannot recognize easily that the obstacle or the use of the other wireless communication terminal has affected the communication speed between the host computer and the printer. That is, even when the error has occurred in the printer owing to the obstacle or the use of the other wireless communication terminal, a user cannot recognize easily what is the cause of the error, and the user may misunderstand the error as a failure of the printer.

Further, the decrease of the communication speed owing to the above described environment occurs at the timing including but not limited to the timing of installing the host computer or the printer. That is, also after a user starts use, an obstacle may be newly installed or a use of another wireless communication terminal that was not used may be started. In such a case, it becomes more difficult for a user to recognize that the decrease of the communication speed owing to the peripheral environment causes an error of the printer, as compared with the timing of installing the host computer or the printer.

In order to resolve these inconveniences, Japanese laid-open patent publication (Kokai) No. 2003-345537 (JP2003-345537A) discloses a technique to determine a quality of communication environment based on an actual communication speed and a parameter that has been set by a user to determine the quality of communication environment.

However, the technique disclosed in the above-mentioned patent publication requires a user to set the parameter for a communication environment examination beforehand. That is, the user must consider and set a reference value to determine whether the communication environment is good or needs to be improved. This requires sophisticated knowledge and troublesome operations of a user.

Especially, when the host computer transmits printing data to the printer using wireless communication, it is difficult for a user to set an appropriate reference value for the determination. That's because, the communication speed needed for receiving printing data normally varies depending on printing ability of a printer.

For example, a printer that can execute a printing process at high speed causes the above-mentioned buffer under-run if printing data is not transmitted at correspondingly high speed. On the other hand, a printer that can execute a printing process only at low speed does not cause the buffer under-run even if printing data is transmitted at relatively low speed.

Thus, since the lower limit of the communication speed at which an error does not occur varies depending on a printing ability of a printer, extremely sophisticated knowledge is needed to a user in order to set an appropriate reference value corresponding to each printer.

SUMMARY OF THE INVENTION

The present invention provides a mechanism that determines whether a detected communication speed reaches a communication speed needed for printing the received printing data successfully according to printing ability of an image forming apparatus, and that notifies a user of the determination result.

Accordingly, a first aspect of the present invention provides an image forming system that is provided with an image forming apparatus and an information processing apparatus that is connected to the image forming apparatus via a wireless communication means and transmits printing data to the image forming apparatus by wireless communication executed by the wireless communication means, the image forming system comprising a detection unit adapted to detect a communication speed of the wireless communication executed between the image forming apparatus and the information processing apparatus by the wireless communication means, an obtainment unit adapted to obtain a communication speed needed so that the image forming apparatus successfully prints the printing data that is received by using wireless communication executed by the wireless communication means according to a printing ability of the image forming apparatus, a determination unit adapted to determine whether the communication speed detected by the detection unit reaches the communication speed obtained by the obtainment unit or not, and a notification unit adapted to notify a user that the detected communication speed is insufficient when the determination unit determines that the communication speed detected by the detection unit does not reach the communication speed obtained by the obtainment unit.

Accordingly, a second aspect of the present invention provides an image forming apparatus that is connected to an information processing apparatus via a wireless communication means and receives printing data from the information processing apparatus by wireless communication executed by the wireless communication means, the image forming apparatus comprising a detection unit adapted to detect a communication speed of the wireless communication executed between the image forming apparatus and the information processing apparatus by the wireless communication means, an obtainment unit adapted to obtain a communication speed needed so that the image forming apparatus successfully prints the print data that is received by using wireless communication executed by the wireless communication means according to a printing ability of the image forming apparatus, a determination unit adapted to determine whether the communication speed detected by the detection unit reaches the communication speed obtained by the obtainment unit or not, and a notification unit adapted to notify a user that the detected communication speed is insufficient when the determination unit determines that the communication speed detected by the detection unit does not reach the communication speed obtained by the obtainment unit.

Accordingly, a third aspect of the present invention provides an information processing apparatus that is connected to an image forming apparatus via a wireless communication means and transmits printing data to the image forming apparatus by wireless communication executed by the wireless communication means, the information processing apparatus comprising a detection unit adapted to detect a communication speed of the wireless communication executed between the image forming apparatus and the information processing apparatus by the wireless communication means, an acquisition unit adapted to acquire a communication speed needed so that the image forming apparatus successfully prints the printing data that is received by using wireless communication executed by the wireless communication means according to a printing ability of the image forming apparatus, a determination unit adapted to determine whether the communication speed detected by the detection unit reaches the communication speed acquired by the acquisition unit or not, and a notification unit adapted to notify a user that the detected communication speed is insufficient when the determination unit determines that the communication speed detected by the detection unit does not reach the communication speed acquired by the acquisition unit.

Accordingly, a fourth aspect of the present invention provides a control method for an image forming apparatus that is connected to an information processing apparatus via a wireless communication means and receives printing data from the information processing apparatus by wireless communication executed by the wireless communication means, the control method comprising a detection step of detecting a communication speed of the wireless communication executed between the image forming apparatus and the information processing apparatus by the wireless communication means, an obtainment step of obtaining a communication speed needed so that the image forming apparatus successfully prints the printing data that is received by using wireless communication executed by the wireless communication means according to a printing ability of the image forming apparatus, a determination step of determining whether the communication speed detected in the detection step reaches the communication speed obtained in the obtainment step or not, and a notification step of notifying a user that the detected communication speed is insufficient when it is determined that the communication speed detected in the detection step does not reach the communication speed obtained in the obtainment step in the determination step.

Accordingly, a fifth aspect of the present invention provides a control method for an information processing apparatus that is connected to an image forming apparatus via a wireless communication means and transmits printing data to the image forming apparatus by wireless communication executed by the wireless communication means, the control method comprising a detection step of detecting a communication speed of the wireless communication executed between the image forming apparatus and the information processing apparatus by the wireless communication means, an acquisition step of acquiring a communication speed needed so that the image forming apparatus successfully prints the printing data that is received by using wireless communication executed by the wireless communication means according to a printing ability of the image forming apparatus, a determination step of determining whether the communication speed detected in the detection step reaches the communication speed acquired in the acquisition step or not, and a notification step of notifying a user that the detected communication speed is insufficient when it is determined that the communication speed detected in the detection step does not reach the communication speed acquired in the acquisition step in the determination step.

Accordingly, a sixth aspect of the present invention provides a computer-readable storage medium storing a control program executing the control methods mentioned above.

According to the present invention, since it is determined whether a detected communication speed reaches a communication speed needed for printing the received printing data successfully according to printing ability of an image forming apparatus and the determination result is notified to a user, the usability is improved.

The features and advantages of the invention will become more apparent from the following detailed description taken in conjunction with the accompanying drawings.

BRIEF DESCRIPTION OF THE DRAWINGS

FIG. 5 is a view showing a communication limit speed table that shows a relation between printing ability of the printer and a limit speed of the communication speed of the wireless USB communication according to the first embodiment.

DESCRIPTION OF THE PREFERRED EMBODIMENTS

Hereafter, embodiments according to the present invention will be described in detail with reference to the drawings.

First Embodiment

Figure 1:
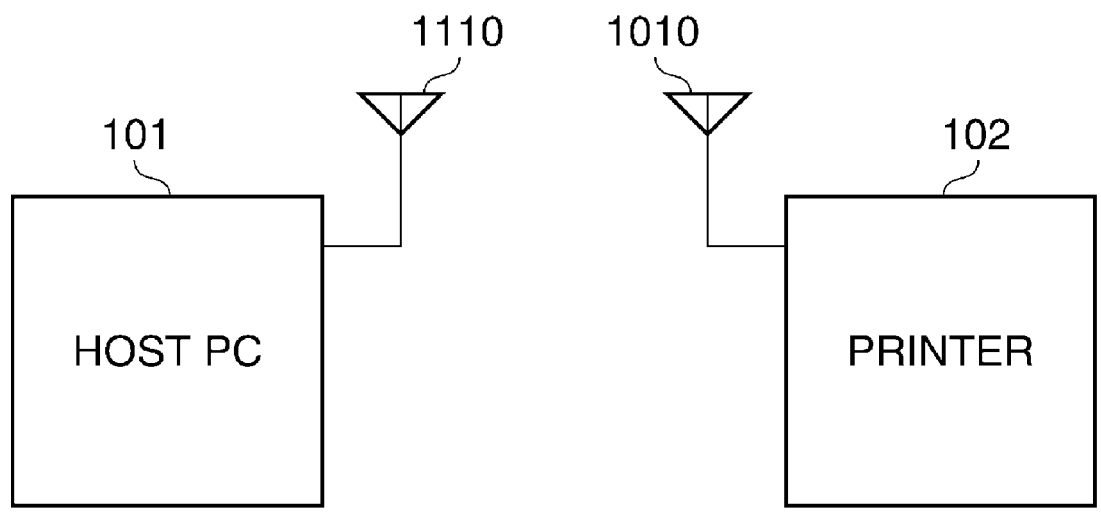
FIG. 1 is a schematic view for describing an image forming system according to a first embodiment of the present invention.

FIG. 1 is a schematic view for describing an image forming system according to a first embodiment of the present invention.

As shown in FIG. 1, the image forming system of this embodiment consists of a host PC 101 as an information processing apparatus, and a printer 102 as an image forming apparatus. They are connected via a wireless communication means such as a wireless USB with each other. A command, a status, etc. are transmitted and received between both apparatuses.

The host PC 101 transmits printing data to the printer 102 by wireless communication executed by the wireless communication means. The printer 102 can print and output an image corresponding to the printing data received from the host PC 101 onto a sheet.

Figure 2:
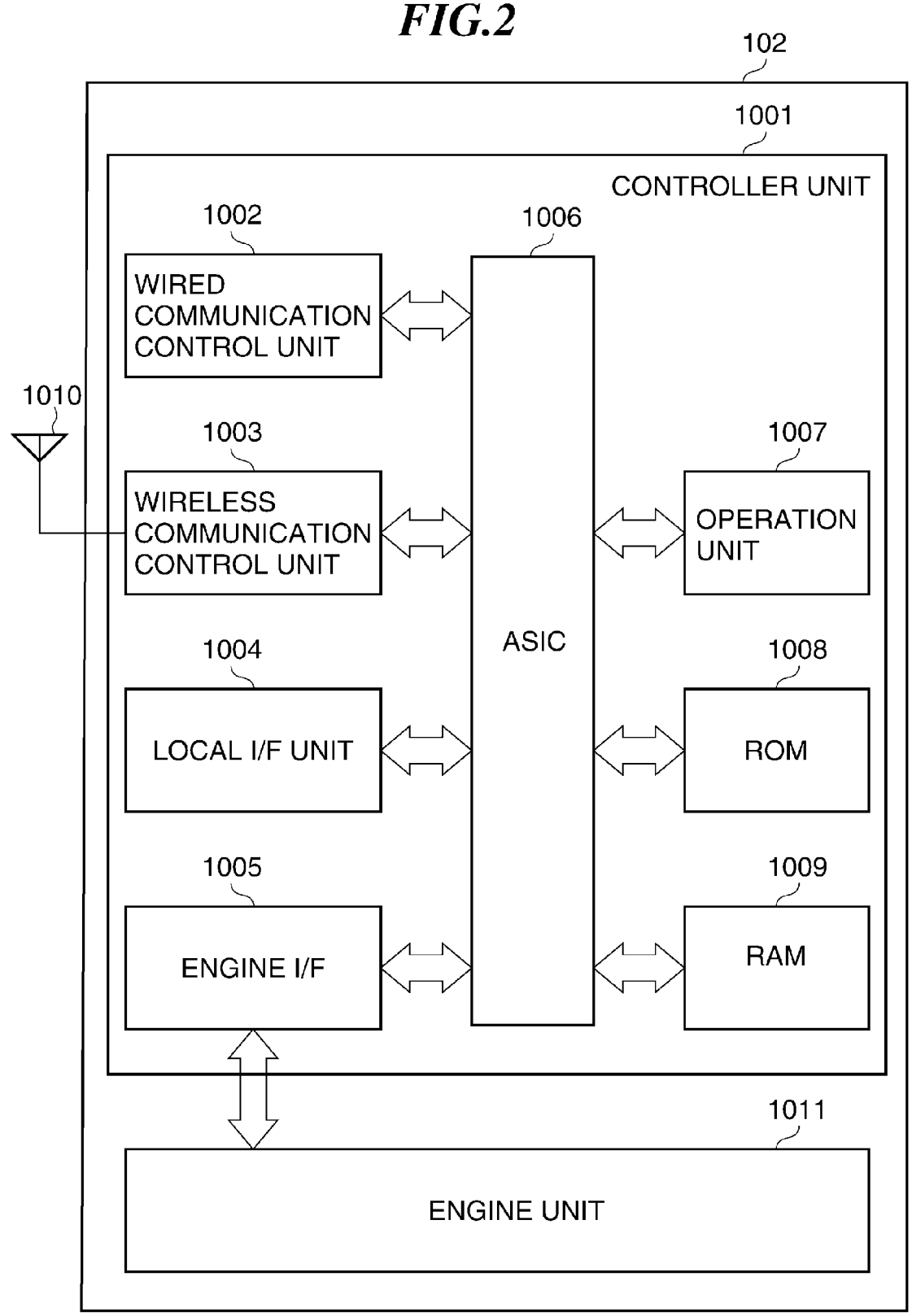
FIG. 2 is a schematic block diagram for describing an example of a device configuration of a printer of FIG. 1.

FIG. 2 is a schematic block diagram for describing an example of a device configuration of the printer 102. As shown in FIG. 2, the printer 102 is provided with a controller unit 1001 and an engine unit 1011.

The controller unit 1001 is provided with a wired communication control unit 1002, a wireless communication control unit 1003, and a local interface unit 1004 that perform exchange with an external interface, data transmission, and data reception. Ethernet (registered trademark), a wireless LAN, a wireless USB, a USB, etc. are exemplified as the external interface.

An antenna 1010 is connected to the wireless communication control unit 1003. The antenna 1010 is used to perform wireless communication with an antenna 1110 (FIG. 1) of the host PC 101, an access point used by a wireless LAN, and the like.

The controller unit 1001 is provided with an ASIC 1006 that processes the printing data received via the wired communication control unit 1002, the wireless communication control unit 1003, or the local interface unit 1004.

The ASIC 1006 incorporates a CPU and outputs the processed printing data to the engine unit 1011 via an engine interface 1005.

Further, the controller unit 1001 is provided with an operation unit 1007, which informs a user of a condition of the printer 102 and allows an input operation by a user, a ROM 1008, which memorizes programs, and a RAM 1009, which acts as an image developing area and as a work area of the program when processing the printing data.

The engine unit 1011 performs a process for printing the printing data, which has been outputted from the ASIC 1006 of the controller unit 1001 via the engine interface 1005, on a sheet.

Here, in this embodiment, a communication speed is determined when a power supply of the printer 102 turns ON to start the printer 102, or when the printer 102 is under a condition for waiting reception of printing data (under a normal standby condition).

First, a process to detect the communication speed of the wireless USB communication when starting the printer 102 and to determine whether the detected communication speed reaches a communication speed needed for printing the received printing data successfully will be described with reference to FIG. 3 and FIG. 4.

Figure 3:
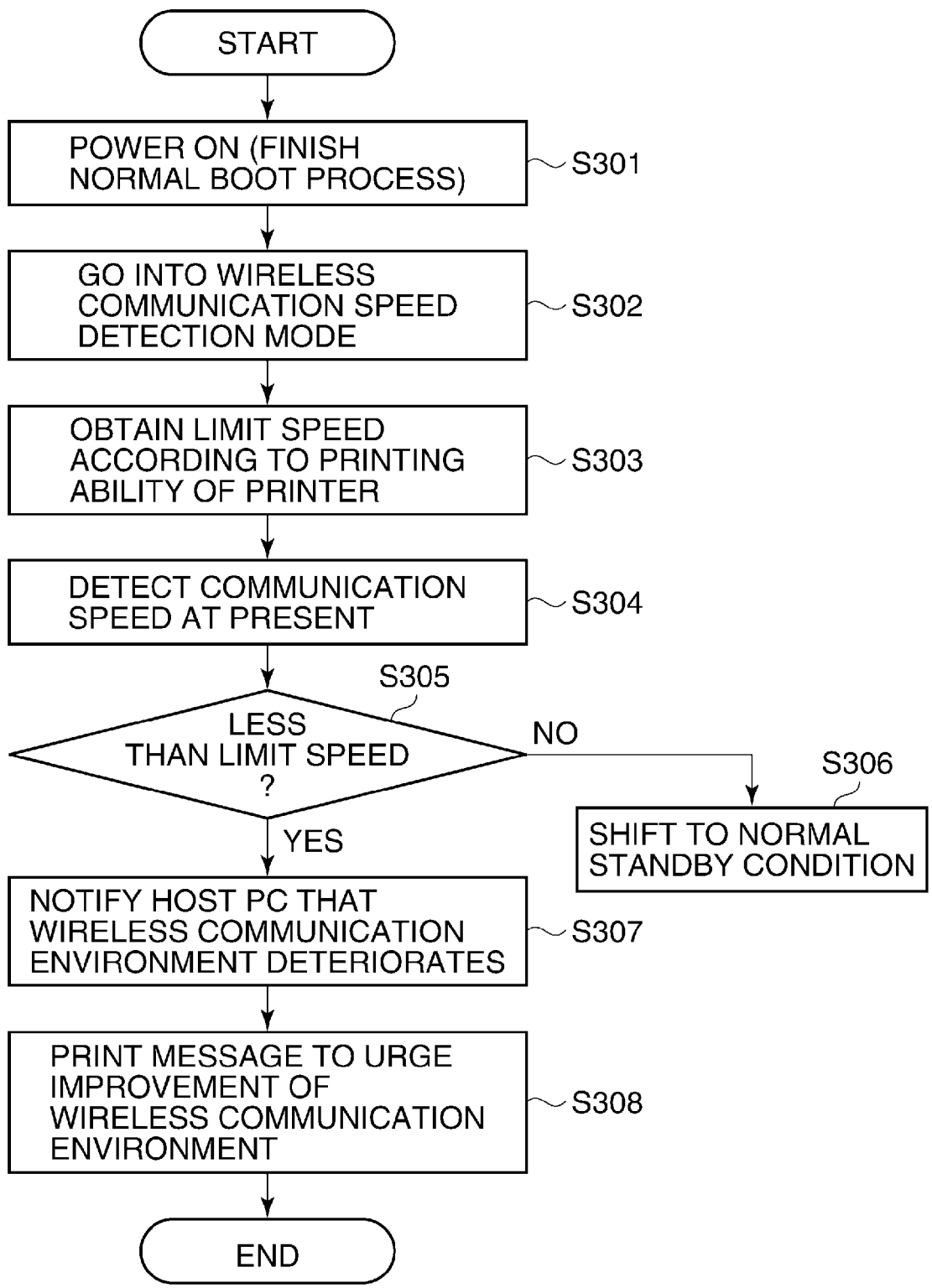
FIG. 3 is a flowchart for describing a process for detecting communication speed of wireless USB communication at a printer side at a starting of the printer according to the first embodiment.

FIG. 3 is a flowchart for describing the processes at the side of the printer 102. Each process in FIG. 3 is realized by loading a control program stored in the ROM 1008, a hard disk, or the like onto the RAM 1009 and by executing the program by the CPU of the ASIC 1006.

First, in step S301, when the power supply of the printer 102 turns ON to start the printer 102, the ASIC 1006 transmits and receives a command, a status, etc. through the wireless communication with the host PC 101, and then proceeds with the process to step S302.

In step S302, the ASIC 1006 goes into a wireless communication speed detection mode, and proceeds with the process to step S303.

In step S303, the ASIC 1006 obtains a communication speed (a communication limit speed, a lower limit value) needed so that the printer 102 successfully prints the printing data that is received by using the wireless communication according to the printing ability of the printer 102 with reference to a communication limit speed table shown in FIG. 5.

FIG. 5 is a view showing a communication limit speed table 201 that shows a relation between the printing ability of the printer and the communication speed needed for printing the received printing data successfully.

This table 201 is stored in a memory area (for example, the ROM 1008 or a hard disk that is not illustrated) of the printer 102. This table 201 is used to manage the information representing a correspondence between a printing ability of a printer and a communication limit speed needed for successfully printing the printing data that is received using the wireless communication. In FIG. 5, if the printing ability of the printer 102 is 40 ppm, it is understood that the communication limit speed is set to 200 Mbps, for example. In this example, the communication speed of 200 Mbps or more is needed for printing the received printing data successfully. It should be noted that the printing ability shows the printing number of sheets that can be outputted per unit time, for example, the printing ability of 40 ppm shows that the printer can output 40 sheets of printed materials per 1 minute.

Next, in step S304, the ASIC 1006 detects the communication speed of the present wireless USB communication, and proceeds with the process to step S305.

In step S305, the ASIC 1006 determines whether the communication speed of the present wireless USB communication detected in step S304 is not less than the communication limit speed obtained in step S303.

And the ASIC 1006 proceeds with the process to step S307, if the communication speed of the present wireless USB communication is less than the communication limit speed. If it is not less than the communication limit speed, the ASIC 1006 proceeds with the process to step S306 and shifts a condition to the normal standby condition.

In step S307, the ASIC 1006 notifies the host PC 101 that the wireless communication environment deteriorated using the wireless USB communication, and proceeds with the process to step S308.

In step S308, the ASIC 1006 transmits the printing data of the message to urge an improvement of wireless communication environment to the engine unit 1011, notifies a user of the message by outputting a sheet on which the message is printed, and finishes the process.

Figure 4:
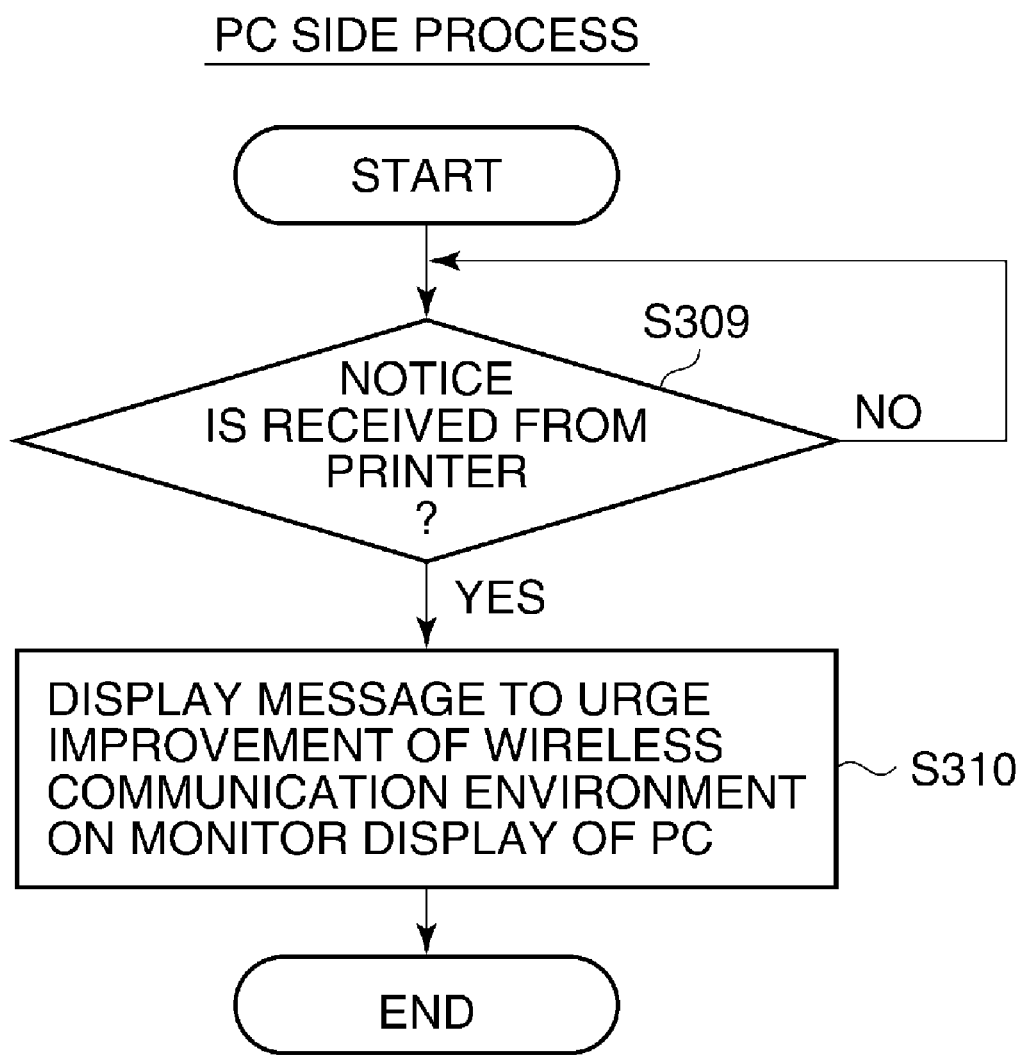
FIG. 4 is a flowchart for describing a process of a host PC side at the starting of the printer according to the first embodiment.

FIG. 4 is a flowchart for describing a process of the host PC 101 side at a starting of the printer. It should be noted that each process in FIG. 4 is realized by loading a program stored in the ROM, the hard disk, or the like of the host PC 101 onto the RAM and by executing the program by the CPU.

First, in step S309, the CPU determines whether the notice that shows the wireless communication environment deteriorated (refer to step S307 in FIG. 3) has been received from the printer 102 or not, and when it has been received, the process proceeds to step S310.

In step S310, the CPU notifies a user by displaying the message to urge an improvement of the wireless communication environment onto a monitor display of the host PC 101, and then finishes the process.

Next, a process to detect the communication speed of the wireless USB communication under the normal standby condition of the printer 102 and to determine whether the detected communication speed reaches a communication speed needed for printing the received printing data successfully will be described with reference to FIG. 6 and FIG. 7.

Figure 6:
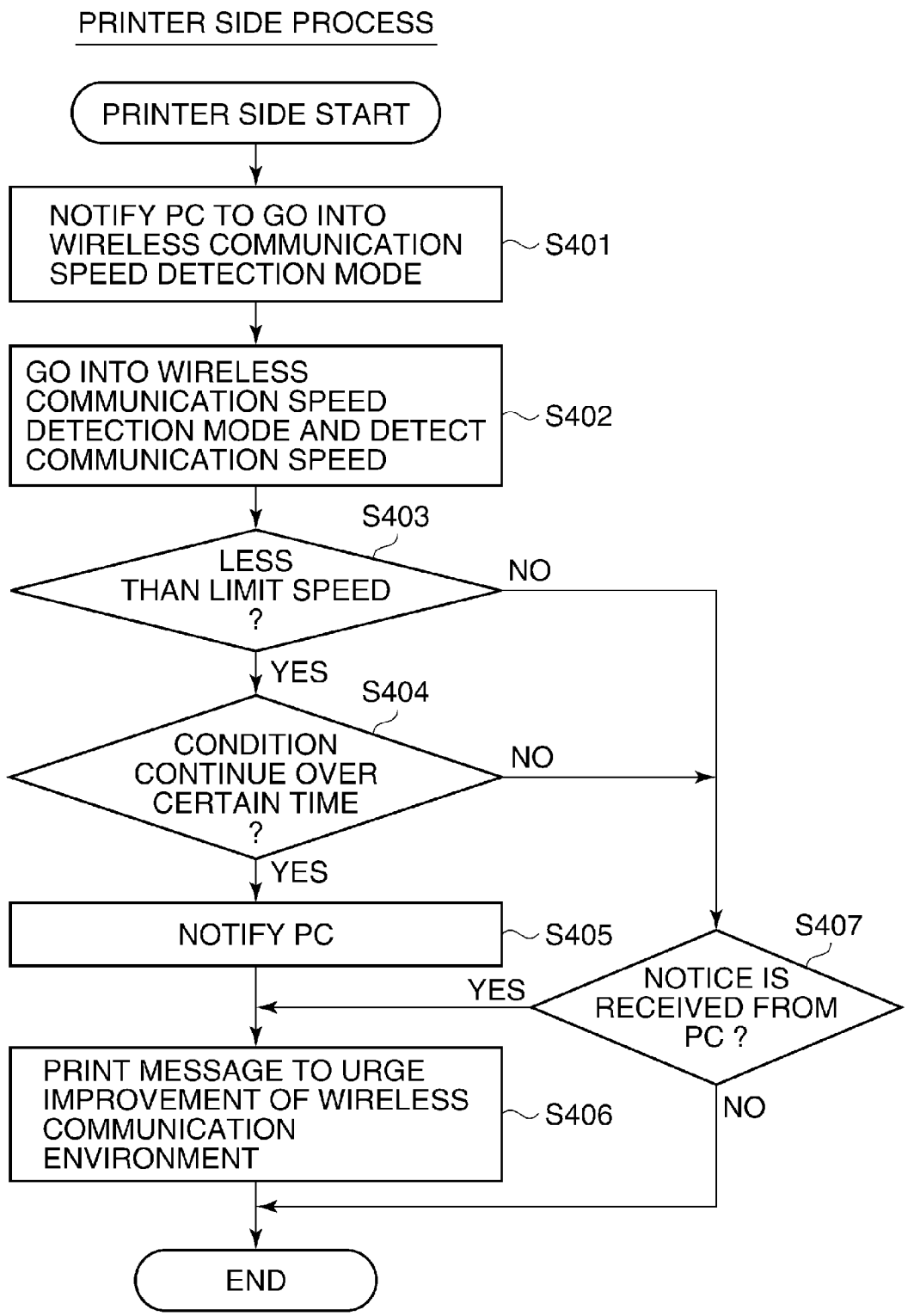
FIG. 6 is a flowchart for describing a process for detecting the communication speed of the wireless USB communication at the printer side under a normal standby condition of the printer according to the first embodiment.

FIG. 6 is a flowchart for describing the processes at the side of the printer 102. Each process in FIG. 6 is realized by loading a control program stored in the ROM 1008, a hard disk, or the like onto the RAM 1009 and by executing the program by the CPU of the ASIC 1006.

First, in step S401, the ASIC 1006 notifies the host PC 101 to go into the wireless communication speed detection mode, and proceeds with the process to step S402. At this time, the communication limit speed obtained in step S303 in FIG. 3 is notified to the host PC 101 in this embodiment.

Next, in step S402, the ASIC 1006 goes into the wireless communication speed detection mode, detects the communication speed of the present wireless USB communication, and proceeds with the process to step S403.

In step S403, the ASIC 1006 determines whether the communication speed of the present wireless USB communication is not less than the communication limit speed obtained in step S303 in FIG. 3.

And the ASIC 1006 proceeds with the process to step S404, if the communication speed of the present wireless USB communication is less than the communication limit speed. If it is not less than the communication limit speed, the ASIC 1006 proceeds with the process to step S407.

In step S404, the ASIC 1006 determines whether the condition under which the communication speed of the present wireless USB communication is less than the communication limit speed has continued over a certain period of time.

And when it has not continued over the certain period of time, the ASIC 1006 proceeds with the process to step S407. When it has continued over the certain period of time, the ASIC 1006 proceeds with the process to step S405, notifies the host PC 101 of this matter, and proceeds with the process to step S406.

In step S407, the ASIC 1006 determines whether the notification, which shows that the host PC 101 determined that the condition under which the communication speed of the wireless USB communication was less than the communication limit speed continued over the certain period of time, has been received from the host PC 101. Here, if the notification from the host PC 101 has been received, the process proceeds to step S406. If the notification from the host PC 101 has not been received, the process is finished.

In step S406, the ASIC 1006 transmits the printing data of the message to urge an improvement of wireless communication environment to the engine unit 1011, notifies a user of the message by outputting a sheet on which the message is printed, and finishes the process.

Figure 7:
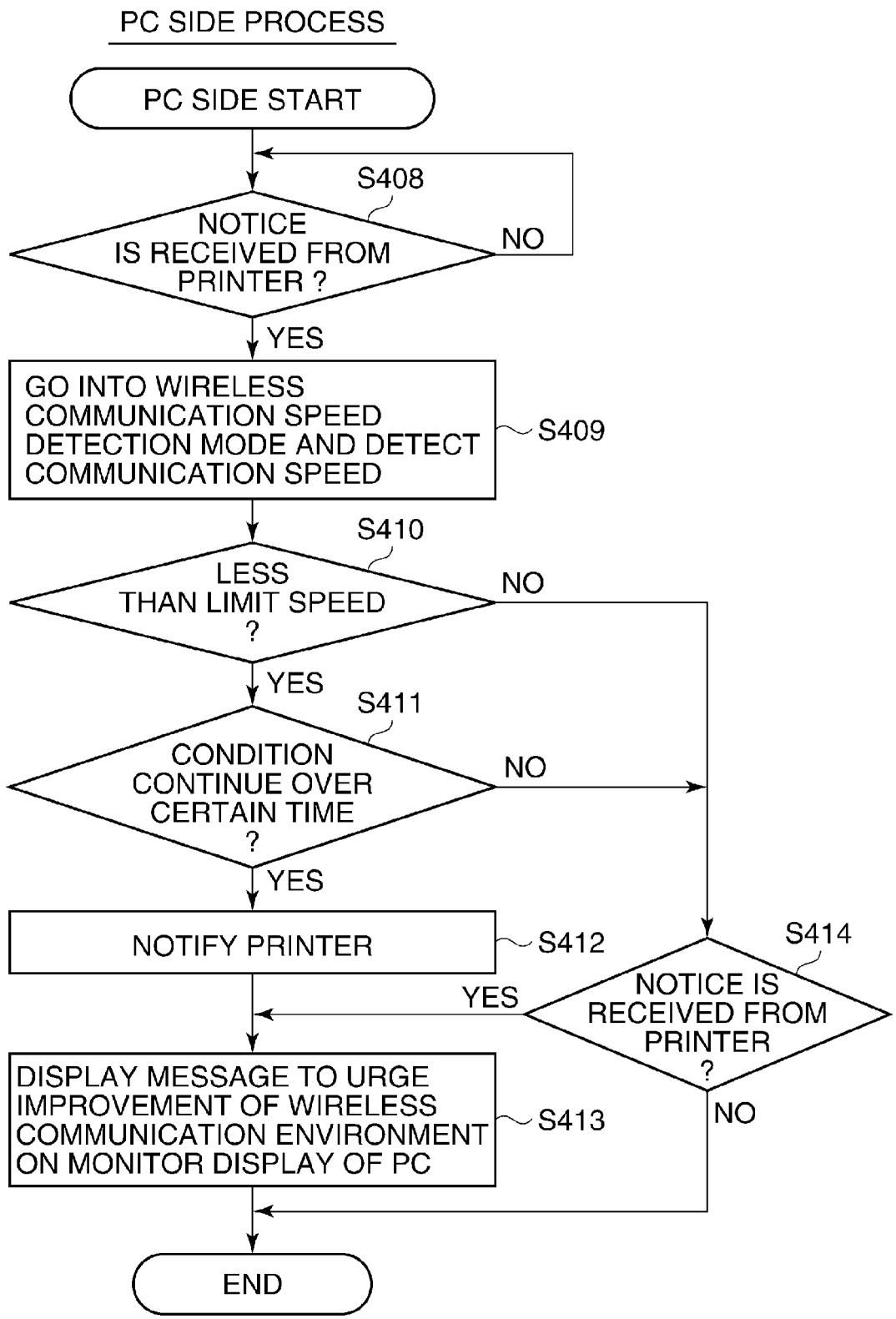
FIG. 7 is a flowchart for describing a process of the host PC side under the normal standby condition of the printer according to the first embodiment.

FIG. 7 is a flowchart for describing a process of the host PC 101 side under the normal standby condition. It should be noted that each process in FIG. 7 is realized by loading a program stored in the ROM, the hard disk, or the like of the host PC 101 onto the RAM and by executing the program by the CPU.

First, in step S408, the CPU (a first acquisition unit) determines whether an instruction to go into the wireless communication speed detection mode transmitted from the printer 102 side in step S401 in FIG. 6 has been received. If the instruction has been received, the process proceeds to step S409.

In step S409, the CPU goes into the wireless communication speed detection mode, detects the wireless communication speed at the present time, and proceeds with the process to step S410.

In step S410, the CPU determines whether the communication speed of the present wireless USB communication detected in step S409 is less than the communication limit speed transmitted from the printer 102 side in step S401 in FIG. 6.

And the CPU proceeds with the process to step S411, if the communication speed of the present wireless USB communication is less than the communication limit speed. If it is not less than the communication limit speed, the CPU proceeds with the process to step S414.

In step S411, the CPU determines whether the condition under which the communication speed of the present wireless USB communication is less than the communication limit speed has continued over a certain period of time.

And when it has not continued over the certain period of time, the CPU proceeds with the process to step S414. When it has continued over the certain period of time, the CPU proceeds with the process to step S412, notifies the printer 102 of this matter, and proceeds with the process to step S413.

In step S414, the CPU determines whether the notification, which shows that the printer 102 determined that the condition under which the communication speed of the wireless USB communication was less than the communication limit speed has continued over the certain period of time, has been received from the printer 102. Here, if the notification from the printer 102 has been received, the process proceeds to step S413. If the notification from the printer 102 has not been received, the process is finished.

In step S413, the CPU notifies a user by displaying the message to urge an improvement of the wireless communication environment onto the monitor display of the host PC 101, and then finishes the process.

Next, the process in step S403 and step S404 in FIG. 6 will be described in detail with reference to FIG. 8. It should be noted that the same process is performed also in step S410 and step S411 in FIG. 7.

Figure 8:
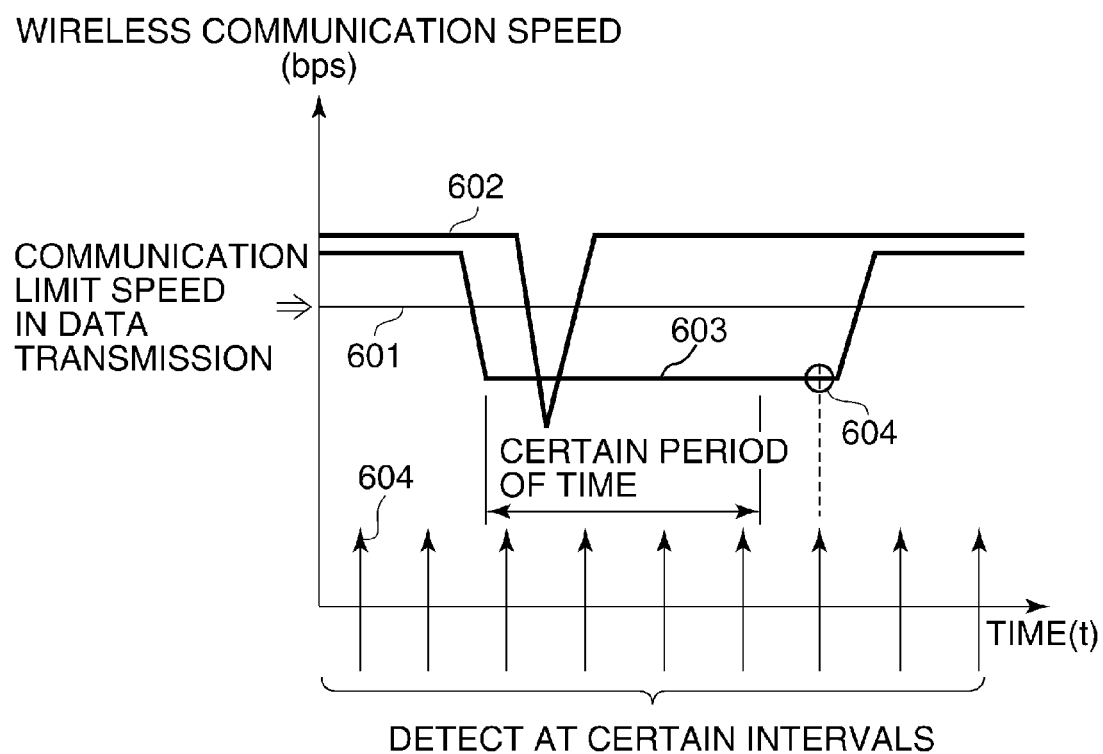
FIG. 8 is a schematic view for describing details of process in step S403 and step S404 in FIG. 6.

In step S403 in FIG. 6, as shown in FIG. 8, the CPU detects the communication speeds 602 and 603 of the present wireless USB communication at certain intervals 604 and determines whether the communication speeds 602 and 603 are less than the communication limit speed 601. Although the communication speed may become less than the communication limit speed 601 momentarily like the communication speed 602, such a reduction is ignored because of having little effect on the transmission and reception of printing data.

In step S404 of FIG. 6, as shown in FIG. 8, the present communication speed 603 is detected at the certain intervals 604, and it is determined whether the condition under which the communication speed of the present wireless USB communication is less than the communication limit speed has continued over the certain period of time by detecting the intervals 604. This is effective when detecting the case where the communication speed is less than the communication limit speed 601 during some long time period, like the case of the communication speed 603.

Thus, when the condition under which the communication speed of the present wireless USB communication is less than the communication limit speed has continued over the certain period of time, there is a high possibility that an obstacle is newly installed or another wireless communication terminal that has an effect on the wireless USB communication is used. Therefore, a user is notified of this matter.

Next, another processing method in this embodiment will be described.

Although the host PC 101 is notified of the communication limit speed from the printer 102 in step S401 in FIG. 6 in the above-mentioned description, the communication limit speed is notified when performing an association process for executing the wireless USB communication in this processing method.

Figure 9A:
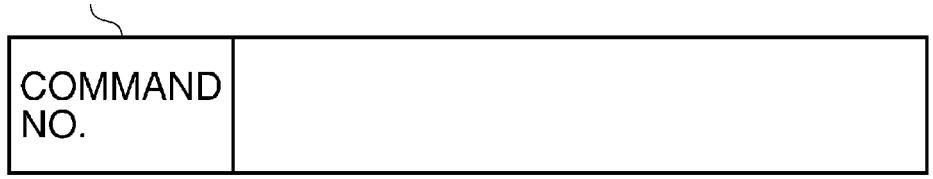
FIG. 9A is a view showing a communication limit speed acquisition command transmitted to the printer from the host PC according to the first embodiment.
Figure 9B:
FIG. 9B is a view showing a communication limit speed status transmitted to the host PC from the printer in response to the command in FIG. 9A.

FIG. 9A is a view showing a communication limit speed acquisition command 501 transmitted to the printer 102 from the host PC 101. FIG. 9B is a view showing a communication limit speed status 502 transmitted to the host PC 101 from the printer 102 in response to the command 501 in FIG. 9A.

These command 501 and status 502 are used in order to exchange communication limit speed information at the time of initial setting (association).

Next, a procedure to transmit the communication limit speed information to the host PC 101 from the printer 102 at the time of initial setting will be described with reference to FIG. 10.

Figure 10:
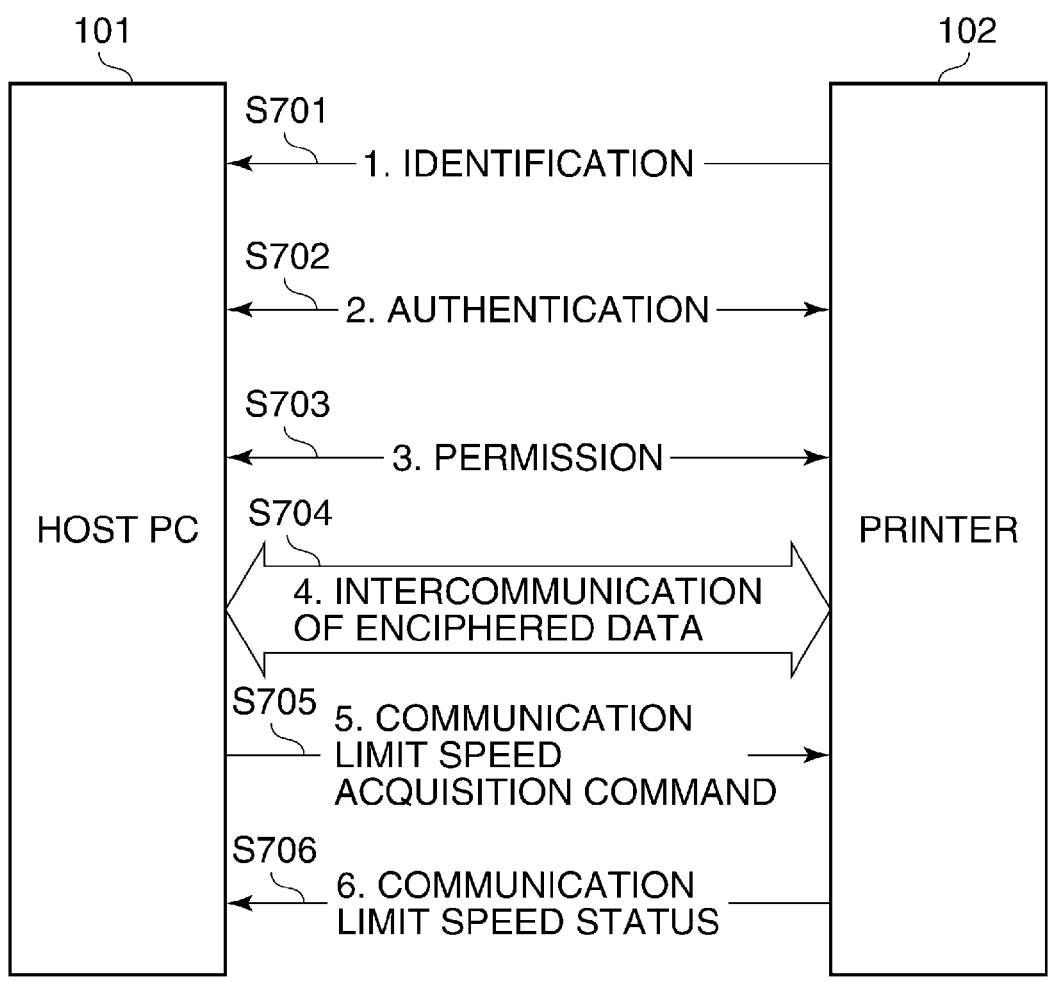
FIG. 10 is a view for describing a procedure to transmit communication limit speed information to the host PC from the printer during an initial setting according to the first embodiment.

In FIG. 10, first, the identification information of the printer 102 is transmitted to the host PC 101 from the printer 102 in step S701, and the printer 102 and the host PC 101 are mutually authenticated in step S702.

Next, the printer 102 and the host PC 101 mutually permit the wireless communication therebetween in step S703, and intercommunication of enciphered data between the printer 102 and the host PC 101 becomes possible in step S704.

After the above initial setting is established, the communication limit speed acquisition command 501 is transmitted to the printer 102 from the host PC 101 in step S705.

Receiving the command 501, the printer 102 embeds the information showing the communication limit speed into the communication limit speed status 502 and transmits it to the host PC 101.

As described above, in this embodiment, the communication speed (the communication limit speed) needed for printing the received printing data successfully is obtained according to the printing ability of the printer 102. Accordingly, a user can be notified that the communication speed does not reach the communication speed needed for printing the received printing data successfully without creating awareness of a user about the printing ability of a printer and the communication environment.

In this embodiment, the communication speed is checked at the time of starting of the printer 102 and under the normal standby condition of the printer 102. Therefore, the communication speed is automatically checked without user's button operations on the printer 102, and the user can be notified that the communication speed does not reach the communication speed needed for printing the received printing data successfully.

Second Embodiment

Next, an image forming system according to a second embodiment of the present invention will be described with reference to FIG. 11 and FIG. 12.

Although the above-mentioned first embodiment shows an example where the communication limit speed table 201 shown in FIG. 5 is stored in the printer 102 side, the present embodiment shows an example where the communication limit speed table 201 shown in FIG. 5 is stored in the host PC 101 side.

It should be noted that the device configurations of the printer 102 and the host PC 101 are the same as that of the above-mentioned first embodiment, the same numerals are attached to the same elements in the following description.

Figure 11:
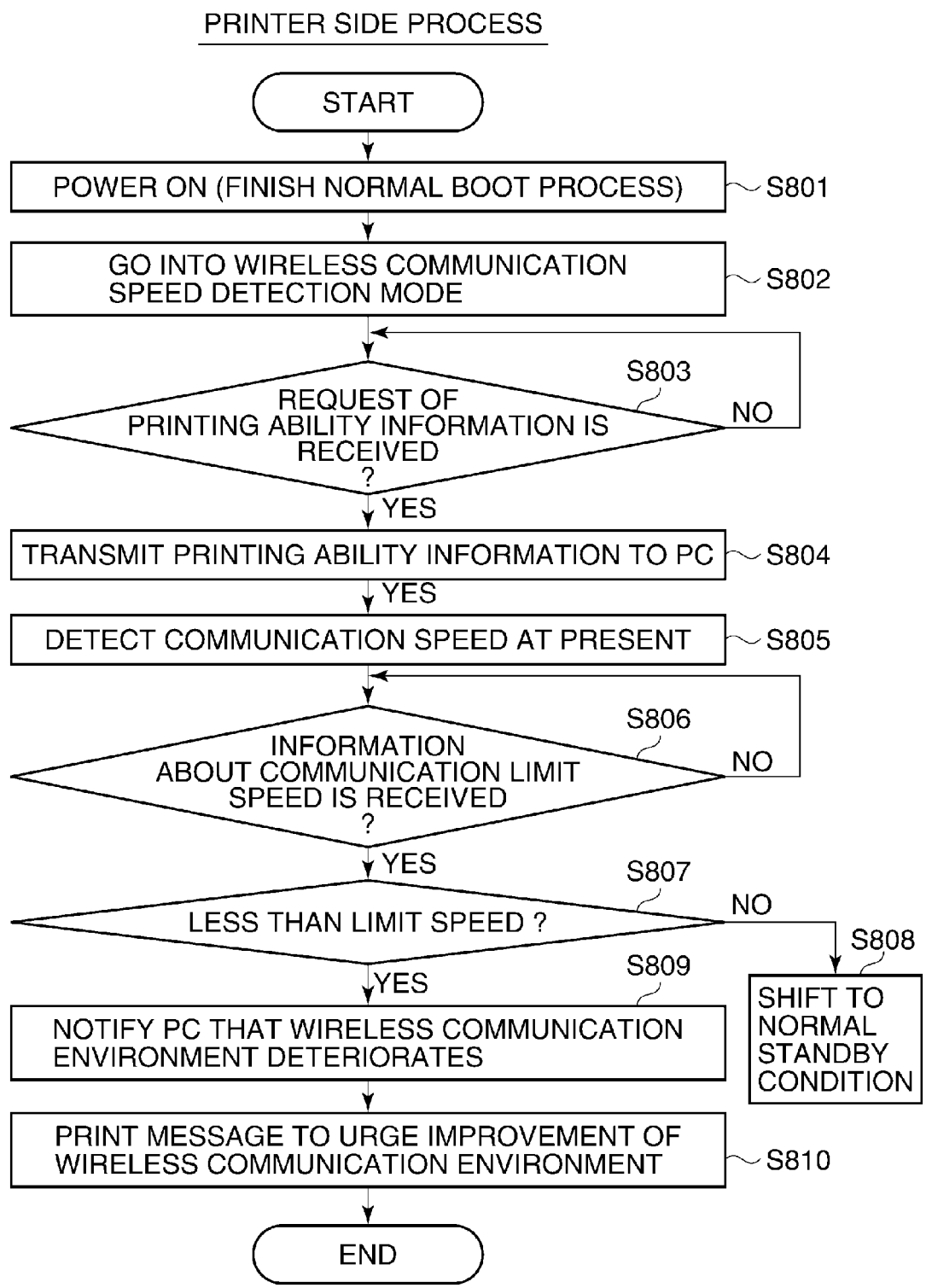
FIG. 11 is a flowchart for describing a process for detecting a communication speed of wireless USB communication at a printer side at a starting of a printer in an image forming system according to a second embodiment of the present invention.

FIG. 11 is a flowchart for describing a process for detecting communication speed of wireless USB communication and a process for determining whether the detected communication speed reaches a communication speed needed for printing the received printing data successfully at a starting of the printer 102. It should be noted that each process in FIG. 11 is realized by loading a program stored in the ROM 1008, the hard disk, or the like onto the RAM 1009 and by executing the program by the CPU of the ASIC 1006.

In FIG. 11, in step S801, when the power supply of the printer 102 turns ON to start the printer 102, the ASIC 1006 transmits and receives a command, a status, etc. through the wireless communication with the host PC 101, and then proceeds with the process to step S802.

In step S802, the ASIC 1006 goes into a wireless communication speed detection mode, and proceeds with the process to step S803.

In step S803, the ASIC 1006 waits for a printing ability information request (refer to step S811 in FIG. 12) and proceeds with the process to step S804 if the request is received.

In step S804, the ASIC 1006 transmits the printing ability information about the printer 102 to the host PC 101, and proceeds with the process to step S805.

In step S805, the ASIC 1006 detects the communication speed of the present wireless USB communication, and proceeds with the process to step S806.

In step S806, the ASIC 1006 determines whether the communication limit speed transmitted from the host PC 101 (refer to step S814 in FIG. 12) has been received, and when it has been received, the process proceeds to step S807.

In step S807, the ASIC 1006 determines whether the communication speed of the present wireless USB communication detected in step S805 is not less than the communication limit speed received in step S806.

And the ASIC 1006 proceeds with the process to step S809, if the communication speed of the present wireless USB communication is less than the communication limit speed. If it is not less than the communication limit speed, the ASIC 1006 proceeds with the process to step S808 and shifts a condition to the normal standby condition.

In step S809, the ASIC 1006 notifies the host PC 101 that the wireless communication environment deteriorated via the wireless USB communication, and proceeds with the process to step S810.

In step S810, the ASIC 1006 transmits the printing data of the message to urge an improvement of wireless communication environment to the engine unit 1011, notifies a user of the message by outputting a sheet on which the message is printed, and finishes the process.

Figure 12:
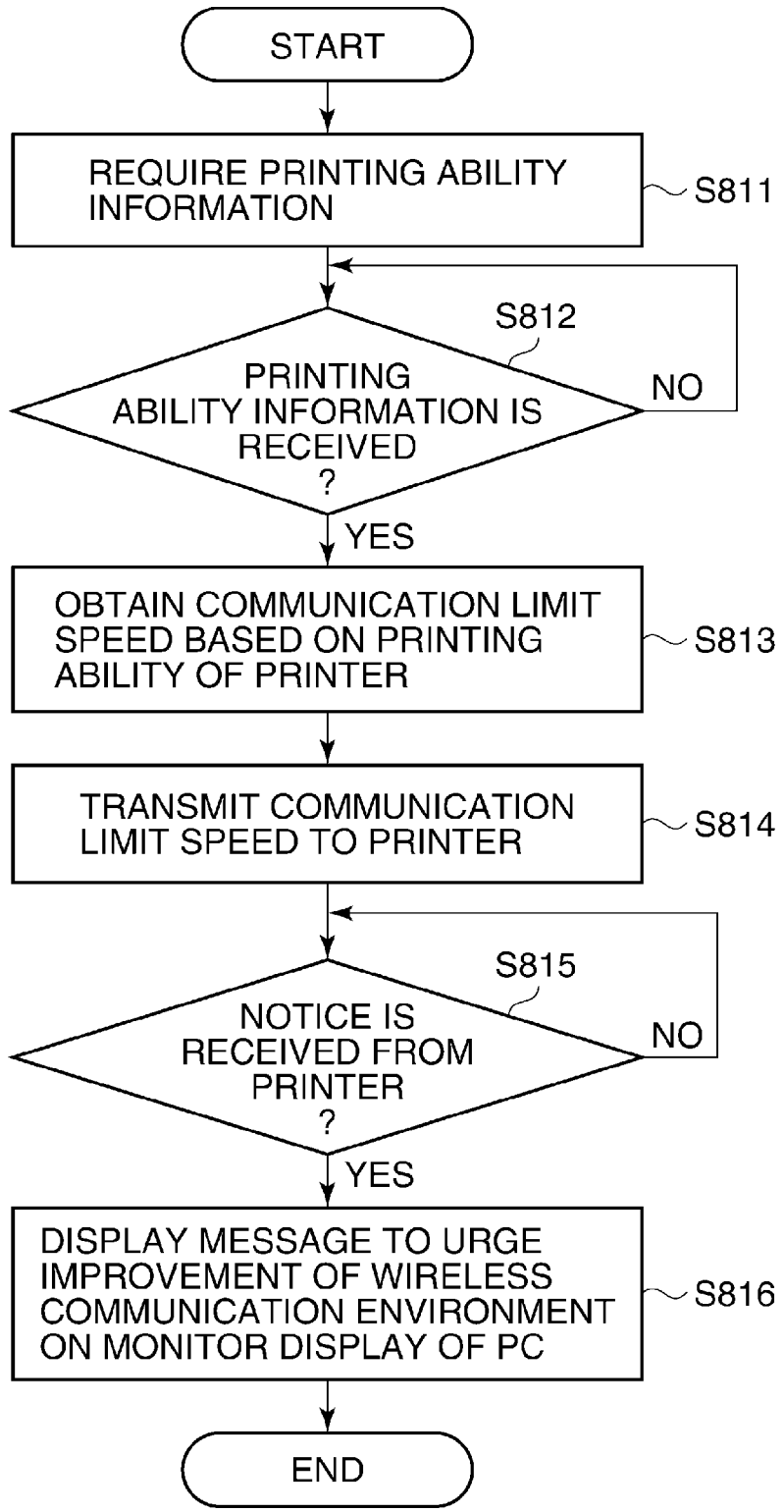
FIG. 12 is a flowchart for describing a process of a host PC side at the starting of the printer according to the second embodiment.

FIG. 12 is a flowchart for describing a process of the host PC 101 side at a starting of the printer. It should be noted that each process in FIG. 12 is realized by loading a program stored in the ROM, the hard disk, or the like of the host PC 101 onto the RAM and by executing the program by the CPU.

In FIG. 12, in step S811, the CPU transmits a request to send the printing ability information (refer to step S803 in FIG. 11) to the printer 102, and proceeds with the process to step S812.

In step S812, the CPU (a second acquisition unit) determines whether the printing ability information transmitted from the printer 102 side has been received, and when it has been received, the process proceeds to step S813.

In step S813, the CPU obtains the communication limit speed based on the printing ability of the printer 102 received in step S812 with reference to the communication limit speed table shown in FIG. 5 stored in the ROM or the hard disk of the host PC 101.

Next, in step S814, the CPU transmits the communication limit speed obtained in step S813 to the printer 102 (refer to step S806 in FIG. 11), and proceeds with the process to step S815.

In step S815, the CPU determines whether the notice that shows the wireless communication environment deteriorated (refer to step S809 in FIG. 11) has been received from the printer 102 or not, and when it has been received, the process proceeds to step S816.

In step S816, the CPU executes a process for displaying the message to urge an improvement of the wireless communication environment onto the monitor display of the host PC 101, and then finishes the process. The remaining configurations, actions, and effects are identical to that of the above-mentioned first embodiment.

It should be noted that the examples where the printing ability of the printer 102 is automatically identified and the communication limit speed is obtained based on the communication limit speed table shown in FIG. 5 have been described in the first and second embodiments. However, the printing ability of the printer 102 is not necessarily identified automatically. For example, when a list of the printing abilities is displayed on a screen of the host PC 101, a user can designate the printing ability of the printer 102 among the displayed candidates.

The data in the communication limit speed table shown in FIG. 5 is stored in the memory within the printer 102 at the time of or before factory shipment. Alternatively, the data can be stored by a manager of the printer 102. It should be noted that the configuration where the above-mentioned communication limit table is used even when the communication speed is checked in the printer side results in the following advantages. That is, when the printing ability of the printer 102 is variable (for example, a user can set up a printing speed), the communication limit speed can be appropriately obtained in response to dynamic change in the printing ability. When the printing ability of the printer 102 is not variable, a common communication limit speed table can be stored into printers that have various printing abilities at a factory. That is, it is not necessary to store the individual data showing the communication limit speed appropriate to each printer. When a printer is actually used, the communication limit speed corresponding to its own printing ability can be read and acquired from the table.

In the above-mentioned description, when the communication speed is determined under the normal standby condition of the printer 102, it is determined whether the condition under which the communication speed is less than the communication speed needed for printing the received printing data successfully has continued over a certain period of time. In the same manner, when the communication speed is determined at a starting of the printer 102, it can be determined whether the condition under which the communication speed is less than the communication speed needed has continued over a certain period of time.

In the above-mentioned description, when the detected communication speed is less than the communication limit speed represented by the information managed in the communication limit speed table, it is determined that the communication speed does not reach the communication speed needed for printing the received printing data successfully. However, when the detected communication speed is not only less than the communication limit speed but is also equal to the communication limit speed, it may be determined that the communication speed does not reach the communication speed needed for printing the received printing data successfully.

According to the above-mentioned configuration, since it is determined whether a detected communication speed reaches a communication speed needed for printing the received printing data successfully according to printing ability of an image forming apparatus and the determination result is notified to a user, the usability is improved.

Further, when it is determined whether a detected communication speed reaches a communication speed needed for printing the received printing data successfully beforehand, it becomes unnecessary to accumulate printing data that is enough not to cause under-run into a buffer. That is, there is an advantage that a printing process of a first page can start more quickly.

It is to be understood that the object of the present invention may also be accomplished by supplying a system or an apparatus with a storage medium in which a program code of software which realizes the functions of the above described embodiment is stored, and causing a computer (or CPU or MPU, etc.) of the system or apparatus to read out and execute the program code stored in the storage medium.

In this case, the program code itself read from the storage medium realizes the functions of any of the embodiments described above, and hence the program code and the computer readable storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, a ROM, and the like. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-184760, filed on Jul. 16, 2008, and which is hereby incorporated by reference herein in its entirety.

What is claimed is:

1. An image forming system that is provided with an image forming apparatus and an information processing apparatus that is connected to the image forming apparatus via a wireless communication means and transmits printing data to the image forming apparatus by wireless communication executed by the wireless communication means, the image forming system comprising:
   a detection unit adapted to detect a communication speed of the wireless communication executed between the image forming apparatus and the information processing apparatus by the wireless communication means;
   an obtainment unit adapted to obtain a communication speed needed so that the image forming apparatus successfully prints the printing data which is received using wireless communication executed by the wireless communication means, according to a printing ability of the image forming apparatus;
   a determination unit adapted to determine whether the communication speed detected by said detection unit reaches the communication speed obtained by said obtainment unit or not;
   a notification unit adapted to notify a user that the detected communication speed is insufficient when said determination unit determines that the communication speed detected by said detection unit does not reach the communication speed obtained by said obtainment unit; and
   a management unit adapted to manage information that shows a relation between the printing ability of the image forming apparatus and the communication speed needed so that the image forming apparatus successfully prints the printing data that is received using wireless communication executed by the wireless communication means,
   wherein said obtainment unit obtains the communication speed based on the information managed by said management unit.

2. The image forming system according to claim 1, wherein said obtainment unit obtains the communication speed according to a printing number of sheets that the image forming apparatus outputs per unit time.

3. The image forming system according to claim 1, wherein said notification unit notifies when the condition under which the communication speed detected by said detection unit does not reach the communication speed obtained by said obtainment unit has continued over a certain period of time.

4. The image forming system according to claim 1, wherein said determination unit is included in the image forming apparatus, and determines at a starting of the image forming apparatus.

5. The image forming system according to claim 1, wherein said determination unit is included in the image forming apparatus, and determines under a normal standby condition of the image forming apparatus.

6. An image forming system that is provided with an image forming apparatus and an information processing apparatus that is connected to the image forming apparatus via a wireless communication means and transmits printing data to the image forming apparatus by wireless communication executed by the wireless communication means, the image forming system comprising:
   a detection unit adapted to detect a communication speed of the wireless communication executed between the image forming apparatus and the information processing apparatus by the wireless communication means;
   an obtainment unit adapted to obtain a communication speed needed so that the image forming apparatus successfully prints the printing dada which is received using wireless communication executed by the wireless communication means, according to a printing ability of the image forming apparatus;
   a determination unit adapted to determine whether the communication speed detected by said detection unit reaches the communication speed obtained by said obtainment unit or not; and
   a notification unit adapted to notify a user that the detected communication speed is insufficient when said determination unit determines that the communication speed detected by said detection unit does not reach the communication speed obtained by said obtainment unit,
   wherein said determination unit is included in the information processing apparatus, and determines in response to a request from the image forming apparatus.

7. The image forming system according to claim 6, wherein the information processing apparatus further comprises:
   a first acquisition unit adapted to acquire the communication speed obtained by said obtaining unit included in the image forming apparatus,
   wherein said determination unit determines based on the communication speed acquired by said first acquisition unit.

8. The image forming system according to claim 7, wherein:
   the information processing apparatus transmits printing data to the image forming apparatus using wireless USB communication executed by the wireless communication means, and
   said first acquisition unit acquires the communication speed when the first acquisition unit performs an association process for executing the wireless USB communication between the information processing apparatus and the image forming apparatus.

9. The image forming system according to claim 6, wherein the information processing apparatus further comprises:
   a second acquisition unit adapted to acquire the information representing the printing ability of the image forming apparatus from the image forming apparatus,
   wherein said obtainment unit included in the information processing apparatus obtains the communication speed based on the information acquired by said second acquisition unit.

10. An image forming apparatus that is connected to an information processing apparatus via a wireless communication means and receives printing data from the information processing apparatus by wireless communication executed by the wireless communication means, the image forming apparatus comprising:

a detection unit adapted to detect a communication speed of the wireless communication executed between the image forming apparatus and the information processing apparatus by the wireless communication means;

an obtainment unit adapted to obtain a communication speed needed so that the image forming apparatus successfully prints the printing data that is received using wireless communication executed by the wireless communication means according to a printing ability of the image forming apparatus;

a determination unit adapted to determine whether the communication speed detected by said detection unit reaches the communication speed obtained by said obtainment unit or not;

a notification unit adapted to notify a user that the detected communication speed is insufficient when said determination unit determines that the communication speed detected by said detection unit does not reach the communication speed obtained by said obtainment unit; and a management unit adapted to manage information that shows a relation between the printing ability of the image forming apparatus and the communication speed needed so that the image forming apparatus successfully prints the printing data that is received using wireless communication executed by the wireless communication means, wherein said obtainment unit obtains the communication speed based on the information managed by said management unit.

11. An information processing apparatus that is connected to an image forming apparatus via a wireless communication means and transmits printing data to the image forming apparatus by wireless communication executed by the wireless communication means, the information processing apparatus comprising:

a detection unit adapted to detect a communication speed of the wireless communication executed between the image forming apparatus and the information processing apparatus by the wireless communication means;

an acquisition unit adapted to acquire a communication speed needed so that the image forming apparatus successfully prints the printing data that is received using wireless communication executed by the wireless communication means according to a printing ability of the image forming apparatus;

a determination unit adapted to determine whether the communication speed detected by said detection unit reaches the communication speed acquired by said acquisition unit or not; and a notification unit adapted to notify a user that the detected communication speed is insufficient when said determination unit determines that the communication speed detected by said detection unit does not reach the communication speed acquired by said acquisition unit.

12. The information processing apparatus according to claim 11, wherein said acquisition unit acquires the communication speed that is obtained in the image forming apparatus and is needed so that the image forming apparatus successfully prints the printing data that is received using wireless communication executed by the wireless communication means.

13. The information processing apparatus according to claim 11, further comprising:

an obtainment unit adapted to obtain a communication speed needed so that the image forming apparatus successfully prints the printing data which is received using wireless communication executed by the wireless communication means according to a printing ability of the image forming apparatus, wherein said acquisition unit acquires the communication speed obtained by said obtainment unit.

14. A control method for an image forming apparatus that is connected to an information processing apparatus via a wireless communication means and receives printing data from the information processing apparatus by wireless communication executed by the wireless communication means, the control method comprising:

a detection step of detecting a communication speed of the wireless communication executed between the image forming apparatus and the information processing apparatus by the wireless communication means;

an obtainment step of obtaining a communication speed needed so that the image forming apparatus successfully prints the printing data that is received using wireless communication executed by the wireless communication means according to a printing ability of the image forming apparatus;

a determination step of determining whether the communication speed detected in said detection step reaches the communication speed obtained in said obtainment step or not;

a notification step of notifying a user that the detected communication speed is insufficient when it is determined that the communication speed detected in said detection step does not reach the communication speed obtained in said obtainment step in said determination step; and a management step of managing information that shows a relation between the printing ability of the image forming apparatus and the communication speed needed so that the image forming apparatus successfully prints the printing data that is received using wireless communication executed by the wireless communication means, wherein said obtainment step obtains the communication speed based on the information managed in said management step.

15. A control method for an information processing apparatus that is connected to an image forming apparatus via a wireless communication means and transmits printing data to the image forming apparatus by wireless communication executed by the wireless communication means, the control method comprising:

a detection step of detecting a communication speed of the wireless communication executed between the image forming apparatus and the information processing apparatus by the wireless communication means;

an acquisition step of acquiring a communication speed needed so that the image forming apparatus successfully prints the printing data that is received using wireless communication executed by the wireless communication means according to a printing ability of the image forming apparatus;

a determination step of determining whether the communication speed detected in said detection step reaches the communication speed acquired in said acquisition step or not; and a notification step of notifying a user that the detected communication speed is insufficient when it is determined that the communication speed detected in said detection step does not reach the communication speed acquired in said acquisition step in said determination step.

16. A non-transitory computer-readable storage medium storing a control program executable by a computer to execute a control method for an image forming apparatus that is connected to an information processing apparatus via a wireless communication means and receives printing data from the information processing apparatus by wireless communication executed by the wireless communication means, the control method comprising:

- a detection step of detecting a communication speed of the wireless communication executed between the image forming apparatus and the information processing apparatus by the wireless communication means;
- an obtainment step of obtaining a communication speed needed so that the image forming apparatus successfully prints the printing data that is received using wireless communication executed by the wireless communication means according to a printing ability of the image forming apparatus;
- a determination step of determining whether the communication speed detected in said detection step reaches the communication speed obtained in said obtainment step or not;
- a notification step of notifying a user that the detected communication speed is insufficient when it is determined that the communication speed detected in said detection step does not reach the communication speed obtained in said obtainment step in said determination step; and
- a management step of managing information that shows a relation between the printing ability of the image forming apparatus and the communication speed needed so that the image forming apparatus successfully prints the printing data that is received using wireless communication executed by the wireless communication means, wherein said obtainment step obtains the communication speed based on the information managed in said management step.

17. A non-transitory computer-readable storage medium storing a control program executable by a computer to execute a control method for an information processing apparatus that is connected to an image forming apparatus via a wireless communication means and transmits printing data to the image forming apparatus by wireless communication executed by the wireless communication means, the control method comprising:

- a detection step of detecting a communication speed of the wireless communication executed between the image forming apparatus and the information processing apparatus by the wireless communication means;
- an acquisition step of acquiring a communication speed needed so that the image forming apparatus successfully prints the printing data that is received using wireless communication executed by the wireless communication means according to a printing ability of the image forming apparatus;
- a determination step of determining whether the communication speed detected in said detection step reaches the communication speed acquired in said acquisition step or not; and
- a notification step of notifying a user that the detected communication speed is insufficient when it is determined that the communication speed detected in said detection step does not reach the communication speed acquired in said acquisition step in said determination step.

* * * * *